(12) United States Patent
Mundhenk et al.

(10) Patent No.: US 9,378,420 B1
(45) Date of Patent: Jun. 28, 2016

(54) SYSTEM FOR DETECTING AN OBJECT OF INTEREST IN A SCENE

(71) Applicant: HRL Laboratories, LLC, Malibu, CA (US)

(72) Inventors: Terrell N. Mundhenk, Calabasas, CA (US); A. Arturo Flores, San Diego, CA (US); Shinko Y Cheng, Cupertino, CA (US); Howard Neely, III, Santa Monica, CA (US); Michael J. Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 61 days.

(21) Appl. No.: 14/292,416

(22) Filed: May 30, 2014

Related U.S. Application Data

(60) Provisional application No. 61/830,896, filed on Jun. 4, 2013.

(51) Int. Cl.
*G06K 9/00* (2006.01)
(52) U.S. Cl.
CPC .................. *G06K 9/00624* (2013.01)
(58) Field of Classification Search
CPC ...................................... G06K 9/62
USPC .......................................... 382/103
See application file for complete search history.

(56) References Cited

U.S. PATENT DOCUMENTS

| 6,263,088 B1 * | 7/2001 | Crabtree | G01S 3/7865 348/169 |
| 2004/0111453 A1* | 6/2004 | Harris | G06K 9/6269 708/200 |
| 2006/0222239 A1* | 10/2006 | Bargeron | G06K 9/6256 382/159 |
| 2007/0127819 A1* | 6/2007 | Lee | G06F 17/3079 382/190 |
| 2009/0208061 A1 | 8/2009 | Matsumoto et al. | |
| 2010/0026721 A1 | 2/2010 | Park et al. | |
| 2012/0294476 A1* | 11/2012 | Wei | G06K 9/3233 382/103 |
| 2013/0155229 A1* | 6/2013 | Thornton | H04N 7/18 348/143 |
| 2013/0266177 A1* | 10/2013 | Sanches | G06K 9/6203 382/103 |
| 2013/0279800 A1* | 10/2013 | Ranganathan | G06K 9/469 382/159 |
| 2014/0254923 A1* | 9/2014 | Vidal Calleja | G06K 9/4676 382/159 |

FOREIGN PATENT DOCUMENTS

WO    WO 2010-021527    2/2010

OTHER PUBLICATIONS

Product Image Classification Based on Local Features and SVM Classifier. Shijie Jia, Yuesheng Gu, Juan Zou. Mar. 28, 2012.*

(Continued)

*Primary Examiner* — Stephen R Koziol
*Assistant Examiner* — Delomia L Gilliard
(74) *Attorney, Agent, or Firm* — Tope-McKay & Associates

(57) ABSTRACT

The present invention relates to a system for detecting an object of interest in a scene. The system operates by receiving an image frame of a scene and extracting features from the image frame, the features being descriptors. The descriptors are quantized to generate PHOW features. A sliding window protocol is implemented to slide a window over the image and analyze the PHOW features that fall inside the window. Finally, the system determines if the PHOW features represent the object of interest and, if so, then designates the window as a location in the image with a detected object of interest.

18 Claims, 10 Drawing Sheets

(56) References Cited

OTHER PUBLICATIONS

Bosch, A., et al., "Image classification using random forests and ferns," Paper presented at the ICCV, 2007.

Csurka, G., et al., Christopher R Dance, Lixin Fan, Jutta Willamowski, Cedric Bray, Paper presented at the ECCV, 2004.

Itti, L., et al., "A model of saliency-based visual attention for rapid scence analysis," IEEE Transactions on Pattern Analysis and Machine Intelligence, 20(11), 1254-1259, 1998.

Lazebnik, S., et al., "Beyond bags of features; spatial pyramid matching for recognizing natural scene categories," Paper Presented at the CVPR, 2006.

Singer, Y., et al., "Pegasos: Primal estimated sub-gradient solver for SVM," Paper presented at the ICML, 2007.

Vedaldi, A., "VLFeat: an open and portable library of computer vision algorithms," retrieved from http://vlfeat.org/, 2008.

International Search Report and the Written Opinion of the International Searching Authority for PCT/US2014/040357; date of mailing Oct. 21, 2014.

Shijie Jia, et al., "Product Image Classification Based on Local Features and SVM Classifier," Journal of Convergence Information Technology(JCIT), vol. 7, No. 5, Mar. 2012, pp. 1-9.

Notification Concerning Transmittal of International Preliminary Report on Patentablity for PCT/US2014/040357; date of mailing Dec. 17, 2015.

International Preliminary Report on Patentablity for PCT/US2014/040357; date of mailing Dec. 17, 2015.

\* cited by examiner

SYSTEM FOR DETECTING AN OBJECT OF INTEREST IN A SCENE

GOVERNMENT RIGHTS

This invention was made with government support under the U.S. Government's REF ASPS Program, Contract Number 154318. The government has certain rights in the invention.

CROSS-REFERENCE TO RELATED APPLICATIONS

This is a non-provisional patent application of U.S. Provisional Application No. 61/830,896, filed on Jun. 4, 2013, entitled, "A device for detecting pedestrians in an outdoor scene utilizing an 'Any Attention' mechanism."

BACKGROUND OF THE INVENTION (1) Field of Invention

The present invention relates to a detection system and, more particularly, to a system for detecting a particular object in an image of a scene.

(2) Description of Related Art

Video systems and other scene monitoring systems are often use to detect and identify objects in a particular scene. Object recognition receives an input image and outputs the image category, whereas object detection (also known as object localization) receives an input image and outputs the location(s) in the image where a particular object category is detected. For example, security systems ideally detect the presence of people or objects in a particular field-of-view and notify the relevant personnel of the intrusion. However, if an animal (e.g., a deer) were to enter a secured area, a notification alert would be deemed a false alarm. As can be appreciated, false alarms (or false positives) tend to desensitize the user and essentially devalue the security system. Thus, it is desirable to have a system that can provide fast and efficient object detection. Existing systems tend to have a degree of error in object detection that, as noted above, devalues the object detection system. Thus, a continuing need exists for a system for effectively detecting objects of interest in a scene.

SUMMARY OF INVENTION

Described is a system for detecting an object of interest in a scene. The system includes one or more processors and a memory. The memory has executable instructions encoded thereon, such that upon execution of the instructions, the one or more processors perform the operations as listed herein. For example, the system receives an image frame of a scene and extracts features from the image frame, the features being descriptors. The descriptors are quantized to generate a pyramid histogram of visual word (PHOW) features. A sliding window protocol is implemented to slide a window over the image and analyze PHOW features that fall inside the window. The system then determines if the PHOW features represent the object of interest and, if so, then designating the window as a location in the image with a detected object of interest.

Determining if the PHOW features represent the object of interest requires several operations, such as subdividing the window into a set of bins. A histogram of the PHOW features is compiled in each bin, the histograms representing a count of PHOW features found in each bin. The histograms are transformed by a Chi-Square homogeneous kernel transform. The transformed histograms are then fed into a support vector machine (SVM) classifier to generate an SVM score for each feature, the SVM scores representing a similarity of an object in the image to a target object. The SVM scores are squashed with a tangential sigmoid so that the SVM scores range from −1.0 to 1.0. The SMV scores are then collected into a list of scores. The list of scores is reduced using Non-Maximal Suppression to generate a reduced list of scores. Finally, a threshold is applied to the reduced list of scores to eliminate any scores below a predetermined threshold and generate object scores, the object scores representing a likelihood that a particular object in the scene is the object of interest.

In another aspect, the features being extracted are dense Scale Invariant Feature Transform (SIFT) descriptors (DSIFT).

In yet another aspect, in extracting the features, the features are extracted at three independent scales.

In another aspect, quantizing the descriptors to generate PHOW features further comprises an operation of performing, for each descriptor, a KD-tree query to identify a learned feature that the descriptor is most similar to, the identified features being the PHOW features.

Further, in implementing the sliding window protocol, the image frame is divided into a plurality of stripes, such that within each stripe are all the windows which might be run at that location in the image frame.

Additionally, the system implements a saliency mask to determine attention zones in the image frame for processing with the sliding window protocol and zones in the image frame that are to be ignored by the sliding window protocol.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
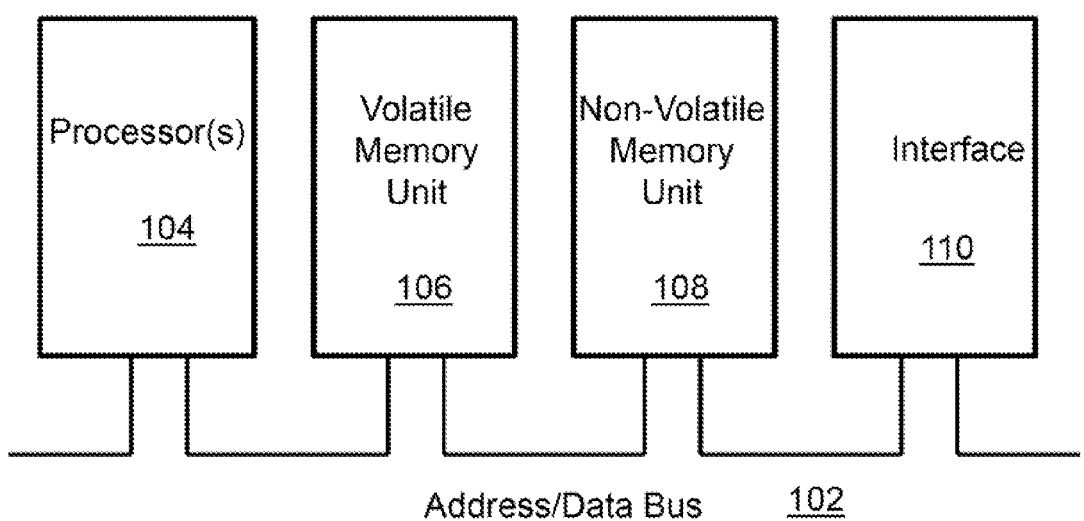
FIG. 1 is a block diagram depicting the components of a system according to the principles of the present invention.

The present invention relates to a detection system and, more particularly, to a system for detecting a particular object in an image of a scene. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, a description of various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is system for detecting objects of interest (e.g., pedestrians) in a scene. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
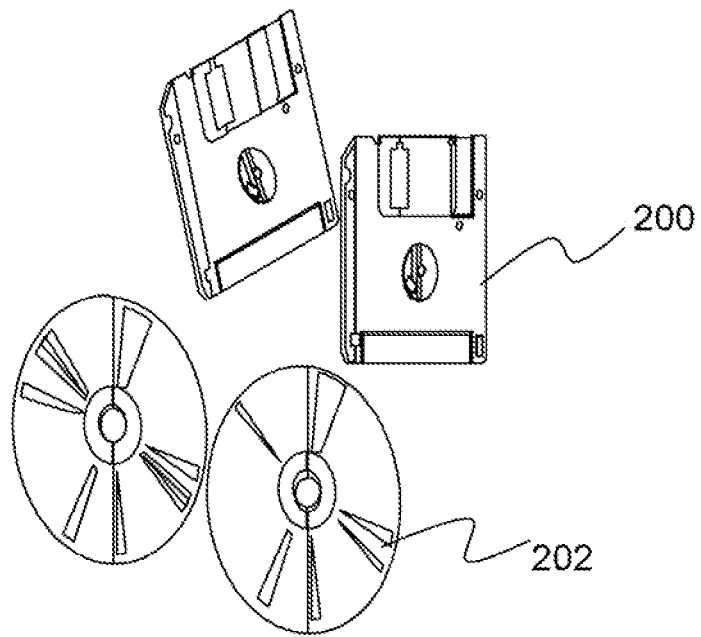
FIG. 2 is an illustration of a computer program product embodying an aspect according to the principles of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

(2) Introduction

The present invention is directed to a detector system for detecting a particular object(s) in an image of a scene. The system improves significantly upon the prior art in both the amount of time taken to process a frame looking for an object and also detection error. The system according to the principles of the present invention agnostically integrates an attention model using an "Any Attention" interface that allows the system to use a wide variety of attention devices. The code and threading is also optimized to work with the "Any Attention" interface. Most of these enhancements are designed to increase the speed of the detection device and include:

a. An "Any Attention" ready sliding window protocol for scanning entire scenes;
b. A new enhanced kernel transformation;
c. Multithreading of:
  i. A KD-Tree query (by feature vector);
  ii. PHOW feature extraction (by scale); and
  iii. "Any Attention" ready sliding window execution (by stripe).

For further understanding, the detector according to the principles of the present invention along with each of the aspects listed above are described in further detail below.

(3) Specific Aspects of the Invention (3.1) The Detector System

Figure 3:
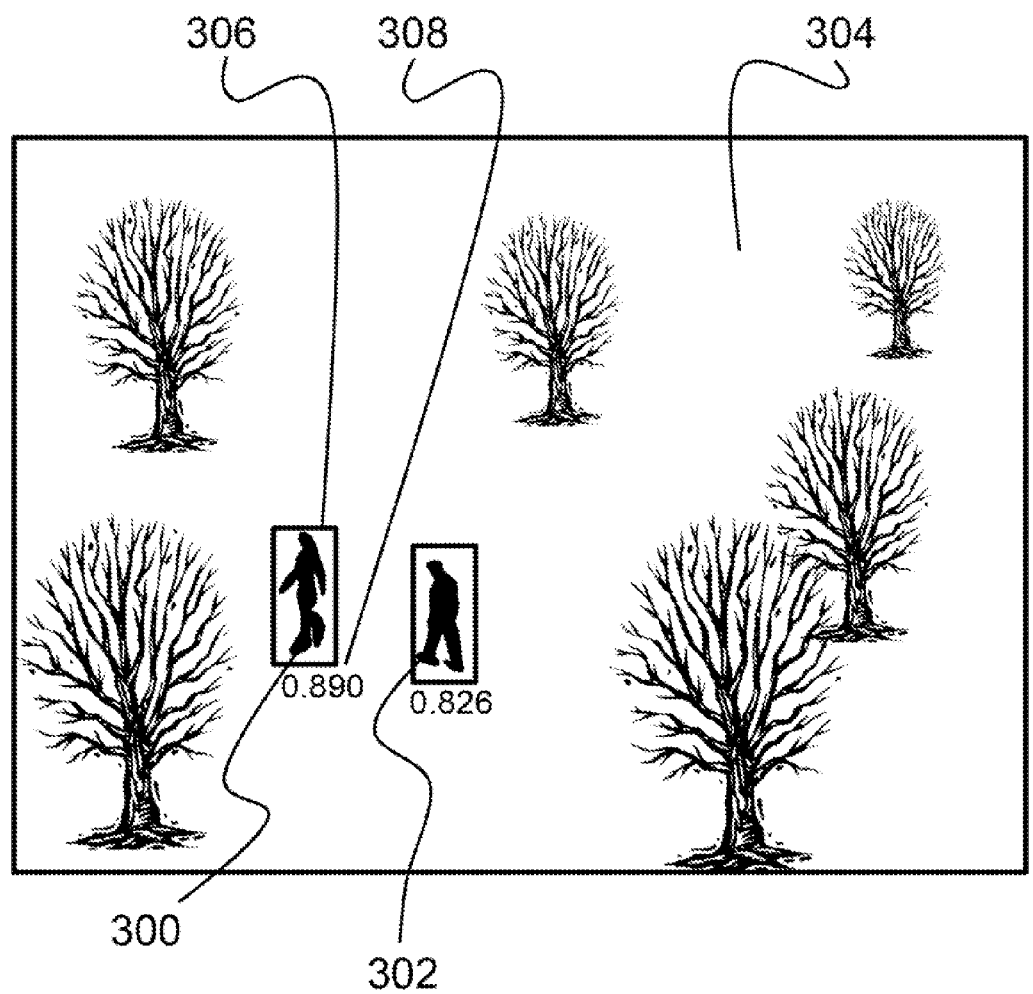
FIG. 3 is an image illustrating the detector system as having detected two people in a natural scene.

The detector system is designed to detect objects of a specific class. Thus, it is designed to spot things such as cars or people in a natural scene. Generally speaking, the detector system works by extracting features from an image and then analyzing these features to see if they statistically resemble a target class of object. This is done by moving a sliding window over the scene. Within the sliding window, features are extracted from the image and tested to see if they match to an object which the detector has been trained to detect. FIG. 3, for example, is an image illustrating the detector system as detecting two people 300 and 302 in a natural scene 304. The box 306 shows the outline of the sliding window which detected them. The number 308 shows a confidence score of the degree to which the detector believes the target objects are people. The scores, in this non-limiting example, range from −1.0 to 1.0. Thus, the scores in this example show that the detector is fairly positive about its assessment (e.g., 0.890 and 0.826).

Figure 4:
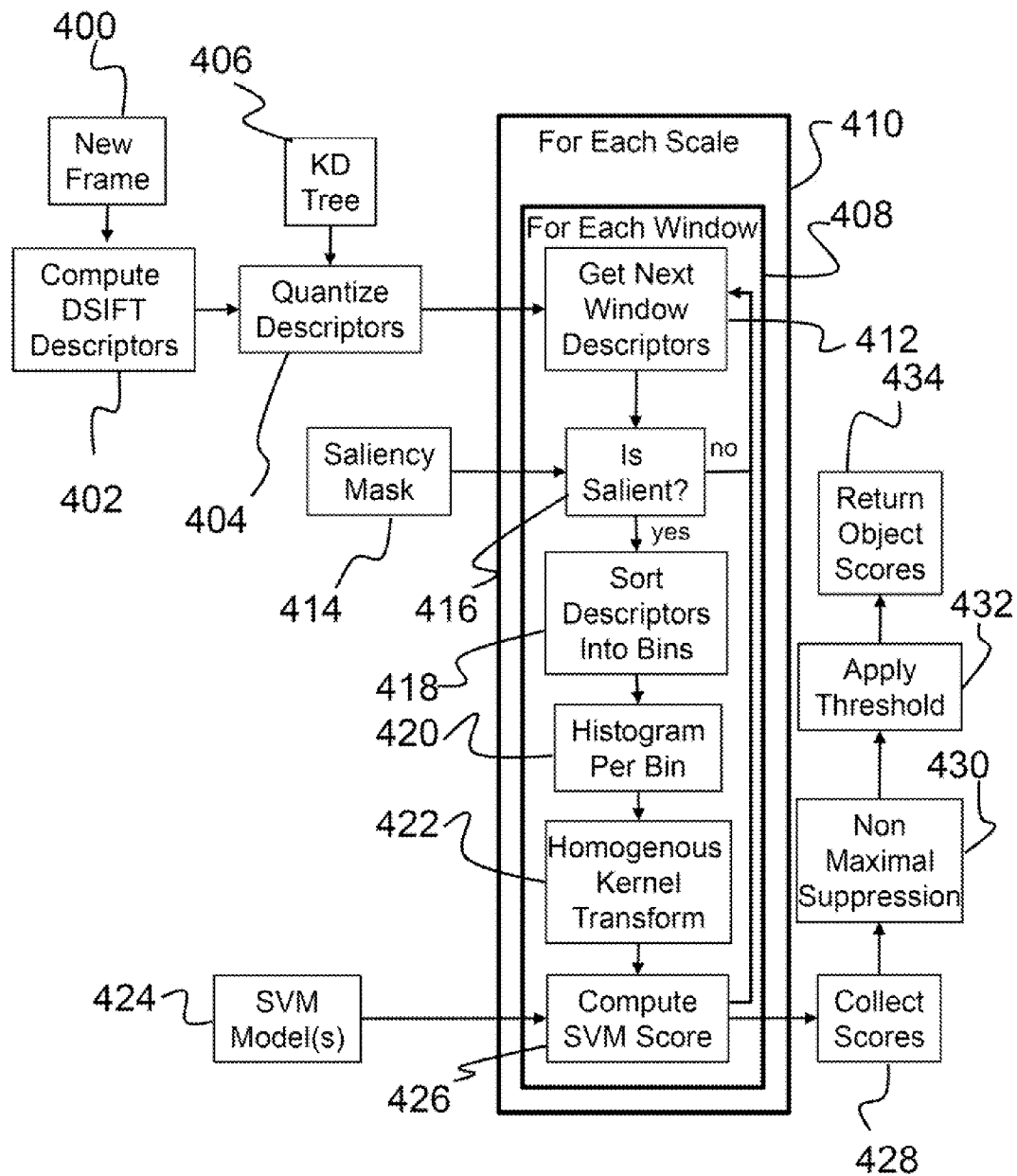
FIG. 4 is a block diagram illustrating process flow of a detector system according to the principles of the present invention.

The detector system works in several stages. FIG. 4, for example, provides a block diagram illustrating process flow of the detector system. The first step (after receiving a new image frame 400) is to extract features over the entire image. The features being extracted are referred to as dense Scale Invariant Feature Transform (SIFT) descriptors (DSIFT) 402. The DSIFT descriptors 402 are derived from the gradients in the image 400 and give an idea of what the lines are like at every location in the image. Next, the DSIFT descriptors are quantized 404 using any suitable quantization technique, a non-limiting example of which was described by Bosch, A., Zisserman, A., & Munoz, X. in "*Image classification using random forests and ferns.*", as presented at the ICCV (2007), which is hereby incorporated by reference as though fully set forth herein. The quantization 404 is a process whereby each descriptor is classified as being like another descriptor the detector system was trained on. Most plainly, the system essentially identifies what each DSIFT descriptor looks like. This is done by using a KD-Tree query 406. The KD-Tree contains a dictionary of thousands of previously learned features. A KD-Tree query 406 looks through this dictionary to find the learned exemplar the particular descriptor is most like. This process is repeated for all the DSIFT descriptors 402 extracted from the image 400. The new quantized features are known as PHOW features (Pyramid Histogram Of visual Words).

Once all the PHOW features have been computed over the entire image, the PHOW features are then reviewed to see if they describe the target object. This is done by using a sliding window. The window moves over the image and all the PHOW features from the part of the image which falls inside the windowed area are gathered together and analyzed. While the system can scan the entire scene using a sliding window, it is desirable to use a selective window to only inspect regions of the image which are most salient to increase speed (as discussed in further detail below). Since the classifier is trained on objects which are approximately the same size as the window, the sliding window protocol is executed with different scaled windows in order to detect targets at many different sizes. A sliding window is a region of interest from which we take features. For instance, a sliding window might be a region 128×64 pixels in size. This is just big enough in many images to contain a pedestrian. Windows of different sizes are used since the best results are obtained when the window is the same size as the pedestrian observed in the image.

During the sliding window protocol, within each window 408 (for each scale 410), the system gathers statistics about the PHOW features and attempts to classify the object in the window based on those statistics. In doing so, the system goes through each descriptor, as follows. In each window 408, the system gathers a descriptor 412 (moving sequentially to obtain descriptors). In other words, each window 408 gathers all the descriptors that are within that window. The descriptors inside a window are gathered at once. The window 408 itself moves sequentially. Each time the window 408 moves, it gathers the features in that location.

As described in further detail below regarding the "Any Attention" module, an attention component 416 determines if the descriptors 412 are sufficiently salient. In doing so, a saliency mask 414 is used to determine if the descriptor 412 is salient enough for further processing. The saliency mask 414 is a mask that masks out regions of the image that are not sufficiently salient per the particular mask. If the descriptor 412 is not salient enough, then the system moves on to the next descriptor and repeats the saliency determination process. If the descriptor 412 is salient enough, then the process continues as described below.

The window is subdivided into a set of bins with the descriptors being sorted 418 into the bins as follows. As a non-limiting example, the window is subdivided in a 3×3 set of bins, similar to that as described by Lazebnik, S., Schmid, C., and Ponce, J. in "*Beyond Bags of Features: Spatial Pyramid Matching for Recognizing Natural Scene Categories*" presented at the CVPR (2006), which is hereby incorporated by reference as though fully set forth herein. Inside each bin, a histogram 420 is compiled of the PHOW features. Doing this over all the bins creates 9 independent histograms. The histograms are a count of how many of each type of PHOW features are found in each bin. The histogram is then transformed by a Chi-Square homogeneous kernel transform 422. The Chi-Square homogenous kernel transform 422 is commonly understood by those skilled in the art and is also described as VLFeat and can be found via the open source library at www.vlfeat.org/overview/svm.html, taken on May 15, 2014, and which is hereby incorporated by reference as though fully set forth herein.

Once the histograms have been transformed, all nine histograms are fed into a support vector machine (SVM) classifier 424 to compute an SVM score 426. The SVM classifier is any suitable SVM classifier, a non-limiting example of which includes the PEGASOS method for SVM, as described by Singer, Y., and Srebro, N., in "*Pegasos: Primal estimated sub-gradient solver for SVM*," paper presented at the ICML (2007), which is hereby incorporated by reference as though fully set forth herein.

When the transformation is combined with a support vector machine classifier, it has the effect of classifying histograms radially but with a flexible radius size. That is, the SVM classifies the collection of histogramed features based on which object they most resemble.

The SVM returns an SVM score 426 for how much an object is like a target object which it has been trained to recognize. If the score is negative, then the object in the window is unlike the trained object. The system uses a tangential sigmoid (see www.en.wikipedia.org/wiki/Sigmoid_function or www.mathworks.com/help/nnet/ref/tansig.html) to squash the SVM output score so that it ranges from −1.0 to 1.0. The tangential sigmoid is also known to those skilled in the art as a hyperbolic tangent sigmoid. Once the SVM score is squashed, the scores are collected 428 together for all the windows analyzed by the sliding window routine. Since the sliding window slides over thousands of locations in each image, the list of scores (collected scores 428) needs to be reduced to just a few good possible detections. The list of scores is reduced using Non-Maximal Suppression (NMS) 430. Most simply, NMS 430 eliminates any score from a window which overlaps another window with a higher score. So, many low scoring windows are eliminated by the fact that there is a much better scoring window very close to it in the scene. Additionally, thresholding 432 is applied such that scores below a predetermined threshold are also eliminated, resulting in the object scores 434 being provided for further processing. In one non-limiting example, the threshold can be set to zero since any score below zero indicates that the SVM will determine that the object in the window is not the target object. The system adds optimization to the NMS by placing scores into bins which reduces the number of scored windows which need to be compared.

(3.2) Enhanced Kernel Transformation

Homogeneous kernel transformation represents a major bottleneck and accounts for between 10 to 20% of the computational overhead. Thus, the present invention improves upon traditional kernel transformation so that it takes less than half the amount of total overhead time of traditional kernel transformation by optimizing the homogeneous kernel transform.

The kernel transformation component 422 computes an approximation to several mathematical functions. It does this using a lookup table and doing a quick derivative. The mathematical functions in question are three equations which compute a Chi-Squares kernel transformation. The approximation is made possible in part by the fact that the input values have a limited and known range.

Figure 5:
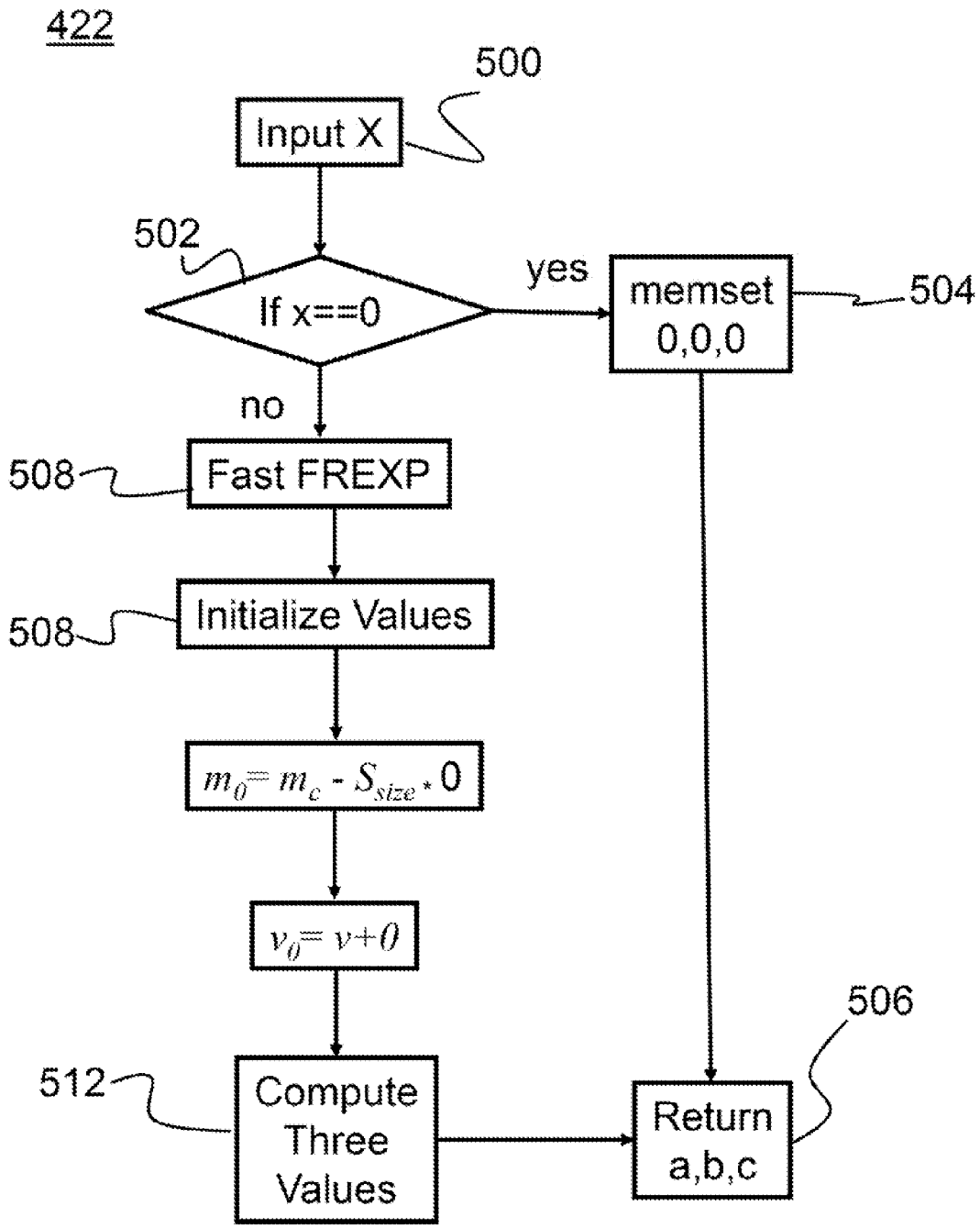
FIG. 5 is a block diagram illustrating process flow homogeneous kernel transformation according to the principles of the present invention.

As shown in FIG. 5, the transformation 422 extracts the mantissa m and exponent p of an input 500 floating point value x, as follows:

$$(m,p) = frexp(x), \quad (1)$$

which is further described below.

One major improvement is made by observing that a large amount of numbers input into the transform are zeros. Thus, the system provides a substantial computational boost over the prior art by checking first for zeros. By the rules of the mathematical transformation, an input value of zero should return zero. The system first determines 502 if the input value 500 is zero, and if so, sets the three return values with memset 504 to zero then returns 506. The three values returned are the chi-squared kernel transformation of the input to the transform. Thus, the transform returns three values. This allows the system to skip the transformation process altogether for that particular input.

If the input value 500 is not zero, then the transformation proceeds with a unique version of frexp called fast frexp 508, which eliminates unnecessary floating point checks such as sub-normal number checking. Example C++ source code snippets of fast frexp 508 is as follows:

```
/*****************************************************
*************************  *************************
*******/
inline float cv_bof_objectlib::cv_bo_frexpf(const float x,
int*exp) const
{
  union
  {
  unsigned i;
  float f;
  }xx;
  xx.f=x;
  const unsigned int hx=xx.i & ~0x80000000;
  const int e=0;
  xx.i=(xx.i & ~0x7f800000)|0x3f000000;
  *exp=e+(hx>>23)-0x7e;
  return (xx.f);
```

The fast frexp 508 returns the exponent and mantisa via bit shifting alone. The mantisa (m) and exponent (p) are then conditioned (initialized 510), as follows:

$$m_c = 2*\text{sign}(m)-1, \quad (2)$$

where * denotes multiplication;

$$p_c = p-1 \quad (3)$$

A base offset is then computed into a lookup table as:

$$v = (p_c - p_{min})*s_n. \quad (4)$$

Here $p_{min}$ is the minimum exponent possible and $s_n$ is the number of subdivisions of the input number with respect to the lookup table. The system then computes the offset (o) of the number from its nearest estimated value, as follows:

$$o = \text{floor}(m_c/S_{size}) \quad (5)$$

Here $S_{size}$ is the size of subdivisions. The system then computes some additional values to get the address and final values, as follows:

$$m_o = m_c - S_{size}*o, \quad (6)$$

$$v_o = v+o. \quad (7)$$

Final values 512 are then computed as:

$$y_\phi = \text{sign}(m) \cdot \{(T_\phi[v_o+1] - T_\phi[v_o]) \cdot S_n \cdot m_o + T_\phi[v_o]\} \quad (8)$$

The final values 512 are computed for each of the three return values. Each $T_\phi$ is a lookup table in memory for one of the three values computed, with the value determined by the offset into memory (It is an array of values).

To summarize, a set of three equations are approximated by using lookup tables. The process took in one single number and plugged it into all three equations and produced a set of three output numbers. The input numbers are the histogramed PHOW values. The outputs are a Chi-Squared transformation of the histogram of quantized PHOW features which are fed into the SVM.

(3.3) Multithreading.

Figure 6:
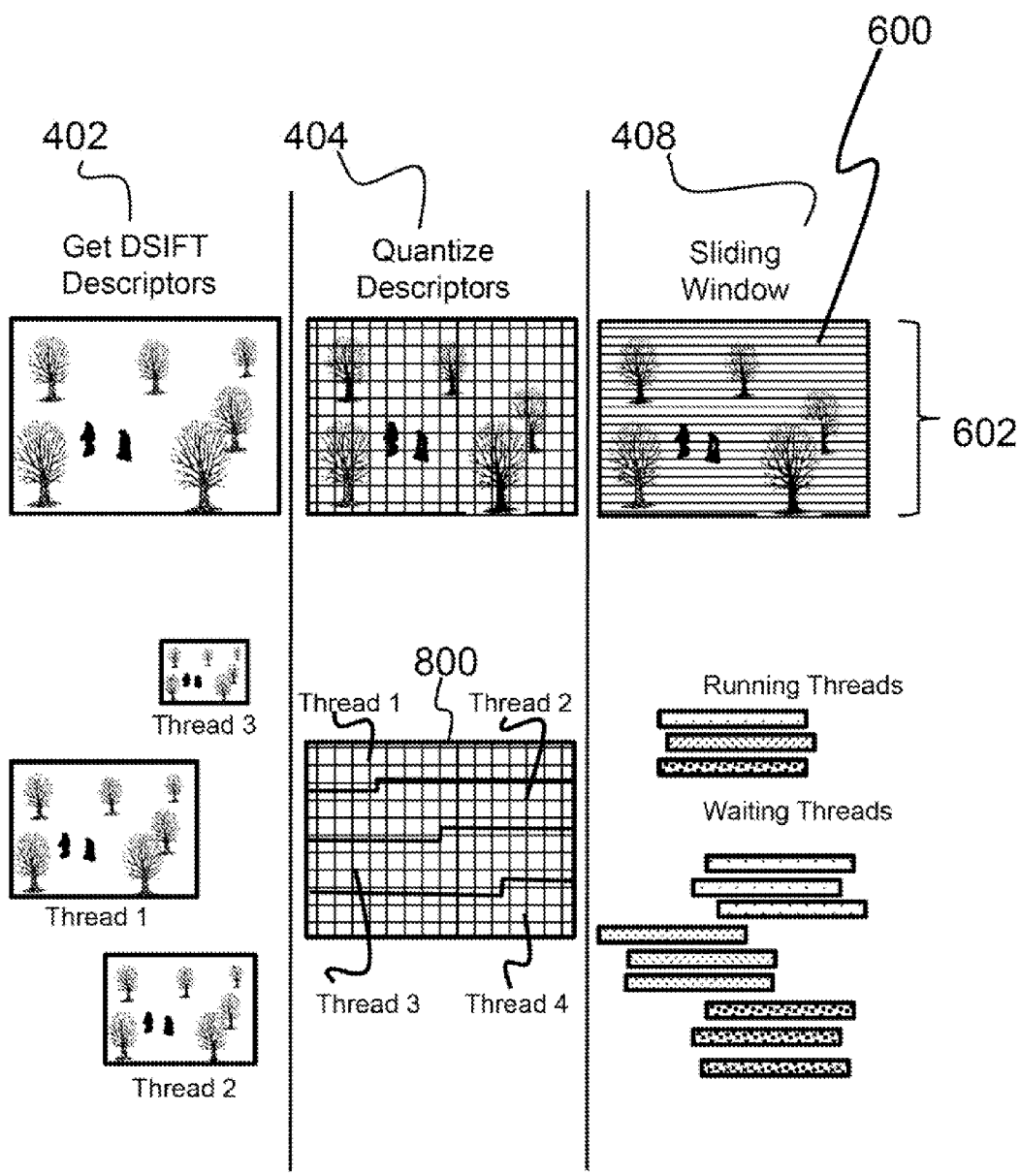
FIG. 6 is an illustration depicting multithreading processes according to the principles of the present invention.

Multithreading is accomplished by several different methods depending on which component is threaded. As shown in FIG. 6, three primary components are multithreaded to take advantage of multicore central processing units (CPUs) which are now standard on most personal computers. The DSIFT descriptors 402 component is threaded by running different scale operations in their own threads. Descriptors are quantized 404 in a per pixel fashion since each quantization is independent of all others. The sliding window 408 threads per stripe of the image, but creates many threads since some stripes have very little processing to do if the attention map blanks out entire rows. Each of these aspects are described in further detail below.

(3.3.1) Multithreading of Get DSIFT Descriptors

The process that obtains the DSIFT descriptors 402 is enhanced by running different scales in their own respective threads. True parallelization is difficult since the DSIFT feature process runs over interdependent components within an image. However, the DSIFT features are extracted at three independent scales. As shown in FIG. 6, each one is then run in its own thread (e.g., Thread 1, Thread 2, and Thread 3). The parent thread then gathers the results. Using this method, DSIFT feature extraction takes as long as the longest scale thread to complete.

Figure 7:
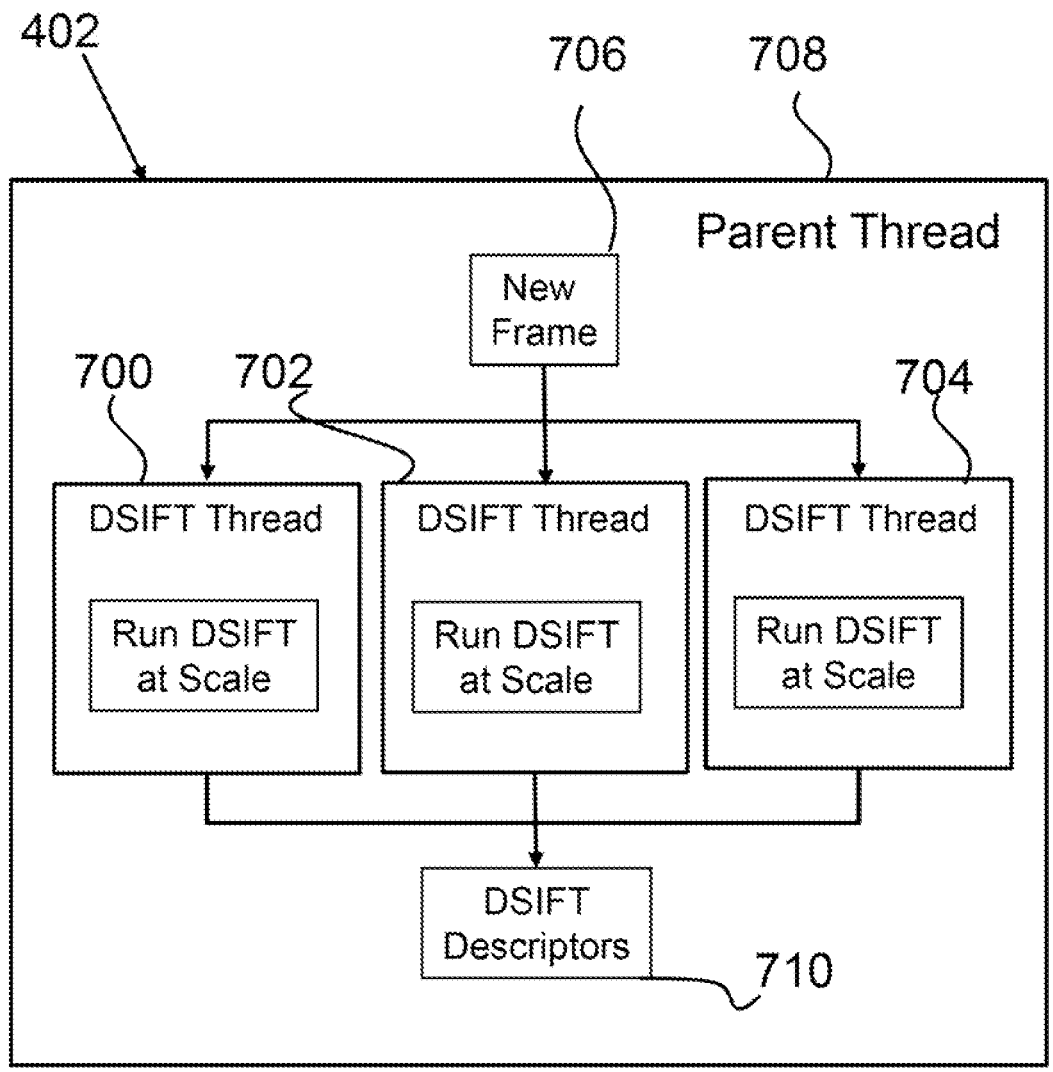
FIG. 7 is a block diagram for the multithreaded DSIFT component according to the principles of the present invention.

As noted above and as illustrated in FIG. 7, the DSIFT descriptors are processed at three different scales. Each scale processing is done independently which makes it easy to split these components off into their own threads. This is done as follows. When the DSIFT creation method is called, it creates three threads 700, 702, and 704, one for each scale. Each thread is given a link to the input image 706 and a set of running parameters. It is then launched and the parent thread 708 will wait for all three threads (700, 702, and 704) to complete. Once the last thread has finished, the parent thread will gather the results from the threads into a full set of DSIFT descriptors 710. This method has the limitation of running at the speed of the slowest thread and not supporting more than three jobs at a time. However, this method is programmatically simple and effectively cuts the time required for computation in half.

(3.3.2) Multithreaded Quantize Descriptors

Quantization 404 of DSIFT features into PHOW features can be nearly perfectly threaded into parallel components. This is because there is a large list of DSIFT features which must each be processed independently. Therefore, it is effective to simply subdivide the list of all DSIFT features into N equal sized subsets where N is the number of cores or virtual cores. This is done by assigning each instance of the kd-tree query a starting and stopping address index into the list of all DSIFT features. Each thread then processes the ones within the index range. Each thread then places the PHOW results into the same result memory at indices reserved for each thread.

Figure 8:
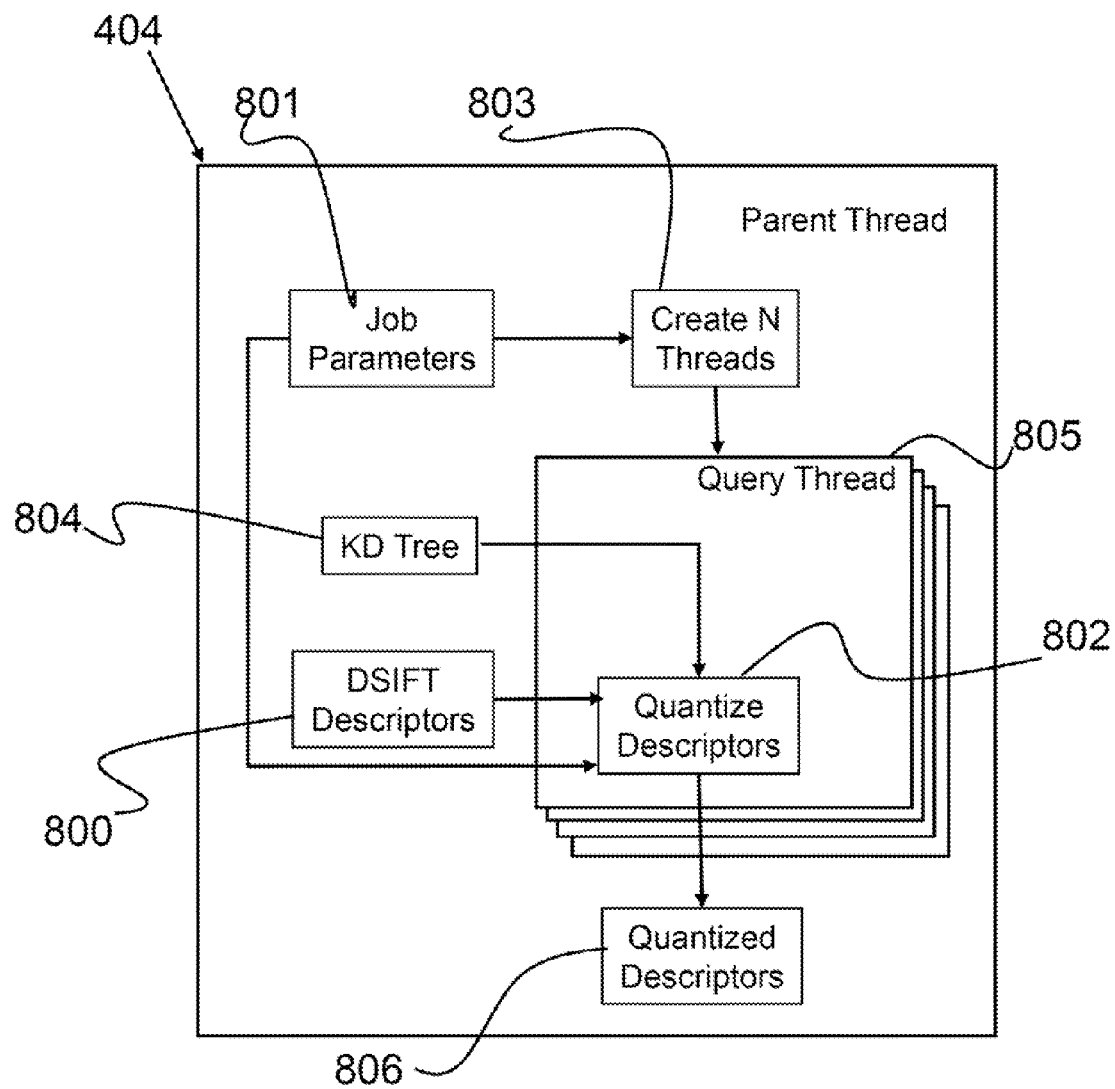
FIG. 8 is a block diagram for the multithreaded descriptor quantization component according to the principles of the present invention.

In other words and as shown in FIG. 8, threading works by allocating equal sized contiguous blocks of DSIFT descriptors 800 to each thread. As shown in both FIGS. 6 and 8, since the DSIFT descriptors 800 are arranged in memory aligned with the input scene image, this effectively assigns contiguous regions of each image frame (i.e., job parameters 801) to each thread, creating N threads 803 (depicted as 4 threads in FIG. 6). The threads 805 are then launched to work on the assigned blocks. The parent thread will wait for all threads to complete. Each thread 805 will then quantize 802 each DSIFT feature 800 in its list using a KD-Tree 804. This returns a list of quantized features 806 which are essentially each DSIFT feature categorized by a previously learned dictionary of features.

Descriptor quantization 404 is much more ideally parallelized since each DSIFT descriptor 800 is quantized independently of all the others. As an example, if there are 4 cores, the system will create 4 threads and send one-fourth of the DSIFT descriptors 800 to each thread to be quantized. The quantization of each DSIFT descriptor takes variable time, but there are several thousand of them and the processing time variance is essentially random. So, this effectively reduces processing time linearly with the number of CPU cores. Thus, it is desirable to limit number of threads to be the same as the number of CPU cores.

(3.3.3) Multithreaded Sliding Windows

Figure 9:
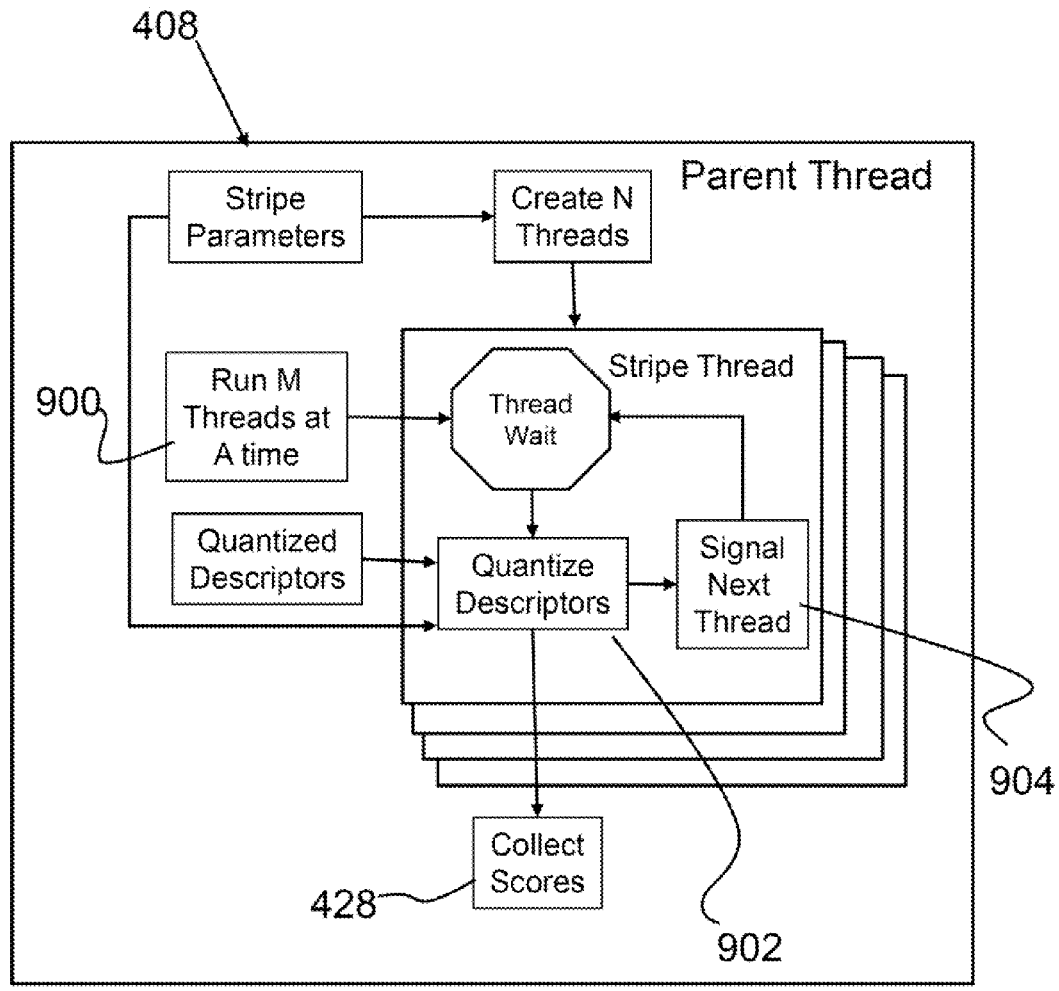
FIG. 9 is a block diagram for the multithreaded sliding window component according to the principles of the present invention.

As shown in FIG. 9, the sliding window 408 component is multi-threaded by assigning each window process into different threads. Thus, a goal is to break the set of all independent window processes into sets per thread. However, due to usage of attention mechanisms to determine which windows are run, parallelization is not straight forward. As shown in FIG. 6, to address this challenge, the system breaks the image 600 into several stripes 602. The number of stripes 602 is much larger than the number of cores. Within each stripe are all the windows which might be run at that location. So, threads are assigned to run all the sliding windows in its stripe. In some cases due to attention mechanisms, there may be no windows to run in a stripe. This is again why there are many more stripe threads than CPU cores.

The following example is provided for further understanding. One ideal way to processes the sliding windows is to break the image frame into equal parts and have each thread process its own parts. It should be explicitly understood that the following example is for illustrative purposes only and that the invention is not intended to be nor shall it be construed or otherwise interpreted as being limited thereto. So for example, if there is an input frame with size 1024×768 pixels and 4 CPU cores, rows 1 to 256 would be assigned to thread 1, rows 257 to 512 would be assigned to thread 2, rows 513 to 768 would be assigned to thread 3 and rows 769 to 1024 would be assigned to thread 4. However, large portions of the image are blocked out by the attention bit mask (as described in further detail below with respect to the saliency bit mask). So, rows 1 to 800 may be uninteresting and essentially turned off. In this example, threads 1 to 3 will have nothing to do and there will be no gain in processing speed since only one thread will do all the work.

As noted above, a solution is to create a large number of stripes. So rather than create four stripes as in the example, it may be desirable to create 32 smaller stripes. This reduces the likelihood that only one stripe will contain all the processable windows. However, it is not desirable to have 32 threads all running at the same time since this can affect context switching efficiency. As such, the system will limit the number of threads that will run at the same time, resulting in some running threads and some waiting threads. A semaphore is used to run only M threads at a time 900. Ideally, M is the number of CPU cores. Thus, each thread is run on the stripe 902. As each stripe thread completes, it signals 904 that it is done, and a new thread is allowed to execute. If there is no region in a stripe to process, the thread terminates and allows a new one to start up. This has the effect of keeping the CPU cores busy. Division of labor in this way is still not linear and provides, for example, a two to three times computational speedup on a four core machine.

(3.4) "Any Attention" Attention Optimization of Sliding Window

Significant performance is gained both in processing time and accuracy of detection by the usage of attention mechanisms to cause the system to avoid processing certain locations in a scene. Depending on the type of attention mechanism used, the sliding window component can ignore between 75 and 94 percent of the scene. The amount of scene ignored corresponds directly to time saved by not processing those parts. Referring again to FIG. 4, the attention component 416 is shown being labeled as "is salient?".

The attention component 416 operates using a saliency bit mask 414. The saliency bit mask 414 is, for example, a 16×16 bit mask (or any other desirable sized mask). This saliency bit mask 414 is then mapped to the current scene image creating, for example, 256 attention zones in the input scene frame.

In other words, saliency will tend to be higher and be above a threshold in the particular attention zone if there are salient features in an image (in that zone). So, for example, if there is a red stop sign in a green forest, it is very easy for a human observer to immediately spot that stop sign. The system emulates that phenomenon. Something which has a unique or vivid color, shape or motion is salient. So in this example, a red stop sign would stick out as salient and above the threshold. The boring background will tend to be ignored and set to 0. People tend to become salient when they move. So, the motion of a person makes them salient and tends to be above threshold. Some things which are unimportant can be salient. However, this is OK. The saliency is only used to narrow the scope of where object identification needs to be applied.

If the saliency bit mask is set to 1, then that part of the scene is salient and will be processed by the sliding window. If the saliency bit mask is set to 0, then that part of the scene is ignored and sliding window will go onto the next position. One possible way this is done is by thresholding a saliency map and marking locations as 1 if the saliency is above a certain threshold and 0 otherwise.

Note that the window is determined to overlap the saliency bit mask 414 at the center location of the window. Thus, the system is primarily interested in the saliency bit mask's 414 value at the center of the sliding window.

Figure 10:
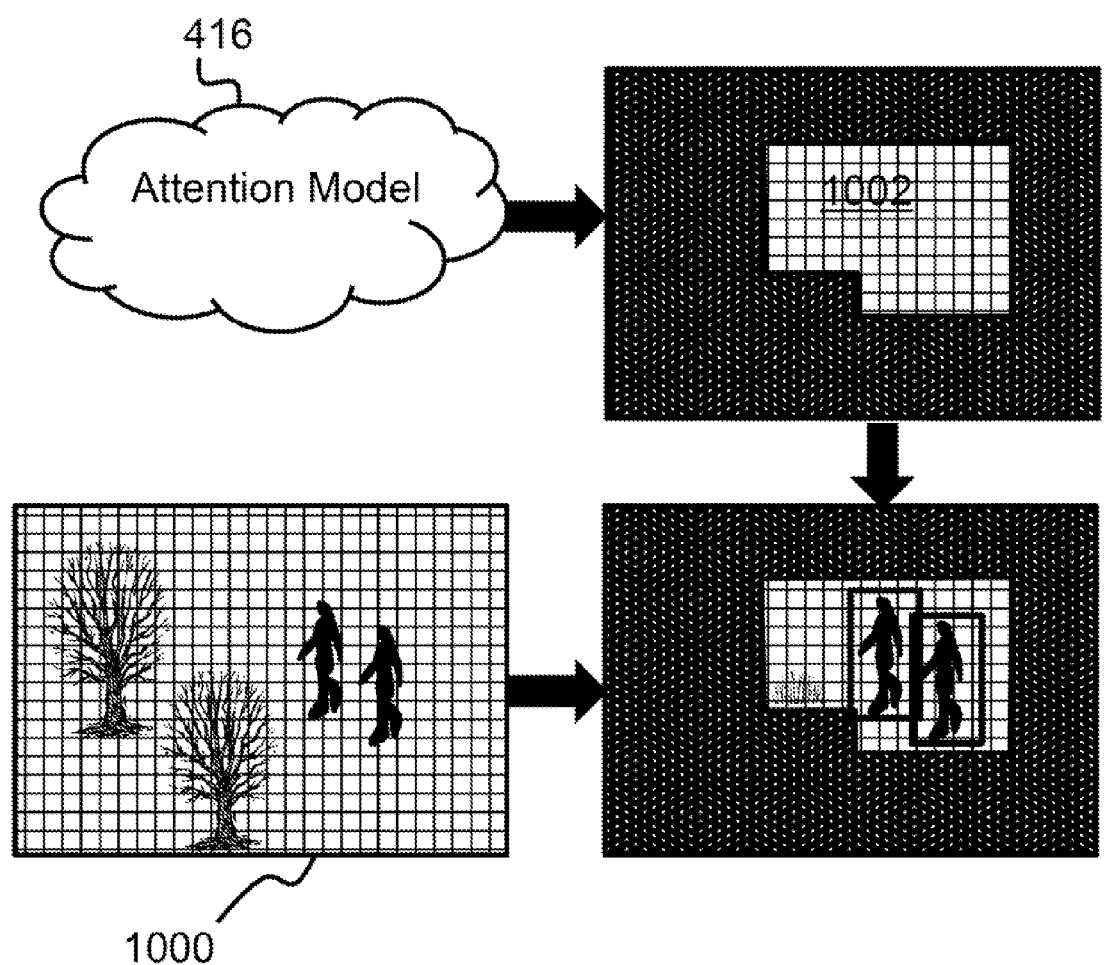
FIG. 10 is an illustration depicting an attention model with a saliency mask.

FIG. 10, for example, illustrates an example of how the saliency bit mask is applied. The attention component 416 operates an attention model that is used to determine which parts of a scene 1000 are interesting based on salient features such as color, line orientation and motion. Parts of the scene 1000 which are uninteresting are blocked out by a 16×16 saliency bit mask 1002. Only the parts which are not blocked out (illustrated within the boxed area in FIG. 10) will be further processed by the detection system. Thus and as shown in FIG. 4, the detection system will continue processing the interesting portions of the scene until it provides a confidence score 434 for any particular object of interest in the scene. The confidence (or object) score 434 represents the likelihood that a particular object in the scene is the object of interest.

What is claimed is:

1. An system for detecting an object of interest in a scene, comprising:
   one or more processors and a memory, the memory having executable instructions encoded thereon, such that upon execution of the instructions, the one or more processors perform operations of:
   receiving an image frame of a scene;
   extracting features from the image frame, the features being descriptors, wherein the features are extracted from the image frame by performing operations of:

creating three threads, one for each of three independent scales;

providing, for each thread, a link to the image frame and a set of running parameters;

running each thread, in parallel, to identify descriptors in each of the three threads;

upon completion of the three threads, compiling the results from each of the three threads into a full set of dense Scale Invariant Feature Transform (SIFT) descriptors (DSIFT);

quantizing the DSIFT descriptors to generate a pyramid histogram of visual word (PHOW) features;

implementing a sliding window protocol to slide a window over the image and analyze PHOW features that fall inside the window; and determining if the PHOW features represent the object of interest and, if so, then designating the window as a location in the image with a detected object of interest.

2. The system as set forth in claim 1, wherein determining if the PHOW features represent the object of interest further comprises operations of:

subdividing the window into a set of bins;

compiling, in each bin, a histogram of the PHOW features, the histograms representing a count of PHOW features found in each bin;

transforming the histograms by a Chi-Square homogeneous kernel transform;

feeding the transformed histograms into a support vector machine (SVM) classifier to generate an SVM score for each feature, the SVM scores representing a similarity of an object in the image to a target object;

squashing the SVM scores with a tangential sigmoid so that the SVM scores range from −1.0 to 1.0;

collecting the SMV scores into a list of scores;

reducing the list of scores using Non-Maximal Suppression to generate a reduced list of scores; and applying a threshold to the reduced list of scores to eliminate any scores below a predetermined threshold and generate object scores, the object scores representing a likelihood that a particular object in the scene is the object of interest.

3. The system as set forth in claim 2, wherein quantizing the descriptors to generate PHOW features further comprises an operation of:

for each descriptor, performing a KD-tree query to identify a learned feature that the descriptor is most similar to, the identified features being the PHOW features;

wherein in implementing the sliding window protocol, the image frame is divided into a plurality of stripes, such that within each stripe are all the windows which might be run at that location in the image frame; and further comprising an operation of implementing a saliency mask to determine attention zones in the image frame for processing with the sliding window protocol and zones in the image frame that are to be ignored by the sliding window protocol.

4. The system as set forth in claim 1, wherein quantizing the descriptors to generate PHOW features further comprises an operation of:

for each descriptor, performing a KD-tree query to identify a learned feature that the descriptor is most similar to, the identified features being the PHOW features.

5. The system as set forth in claim 1, wherein in implementing the sliding window protocol, the image frame is divided into a plurality of stripes, such that within each stripe are all the windows which might be run at that location in the image frame.

6. The system as set forth in claim 1, further comprising an operation of implementing a saliency mask to determine attention zones in the image frame for processing with the sliding window protocol and zones in the image frame that are to be ignored by the sliding window protocol.

7. A computer program product for detecting an object of interest in a scene, the computer program product comprising:

a non-transitory computer-readable medium having executable instructions encoded thereon, such that upon execution of the instructions by one or more processors, the one or more processors perform operations of:

receiving an image frame of a scene;

extracting features from the image frame, the features being descriptors, wherein the features are extracted from the image frame by performing operations of:

creating three threads, one for each of three independent scales;

providing, for each thread, a link to the image frame and a set of running parameters;

running each thread, in parallel, to identify descriptors in each of the three threads;

upon completion of the three threads, compiling the results from each of the three threads into a full set of dense Scale Invariant Feature Transform (SIFT) descriptors (DSIFT);

quantizing the DSIFT descriptors to generate a pyramid histogram of visual word (PHOW) features;

implementing a sliding window protocol to slide a window over the image and analyze PHOW features that fall inside the window; and determining if the PHOW features represent the object of interest and, if so, then designating the window as a location in the image with a detected object of interest.

8. The computer program product as set forth in claim 7, wherein determining if the PHOW features represent the object of interest further comprises operations of:

subdividing the window into a set of bins;

compiling, in each bin, a histogram of the PHOW features, the histograms representing a count of PHOW features found in each bin;

transforming the histograms by a Chi-Square homogeneous kernel transform;

feeding the transformed histograms into a support vector machine (SVM) classifier to generate an SVM score for each feature, the SVM scores representing a similarity of an object in the image to a target object;

squashing the SVM scores with a tangential sigmoid so that the SVM scores range from −1.0 to 1.0;

collecting the SMV scores into a list of scores;

reducing the list of scores using Non-Maximal Suppression to generate a reduced list of scores; and applying a threshold to the reduced list of scores to eliminate any scores below a predetermined threshold and generate object scores, the object scores representing a likelihood that a particular object in the scene is the object of interest.

9. The computer program product as set forth in claim 8, wherein quantizing the descriptors to generate PHOW features further comprises an operation of:

for each descriptor, performing a KD-tree query to identify a learned feature that the descriptor is most similar to, the identified features being the PHOW features;

wherein in implementing the sliding window protocol, the image frame is divided into a plurality of stripes, such that within each stripe are all the windows which might be run at that location in the image frame; and further comprising an operation of implementing a saliency mask to determine attention zones in the image frame for processing with the sliding window protocol and zones in the image frame that are to be ignored by the sliding window protocol.

10. The computer program product as set forth in claim 7, wherein quantizing the descriptors to generate PHOW features further comprises an operation of:
for each descriptor, performing a KD-tree query to identify a learned feature that the descriptor is most similar to, the identified features being the PHOW features.

11. The computer program product as set forth in claim 7, wherein in implementing the sliding window protocol, the image frame is divided into a plurality of stripes, such that within each stripe are all the windows which might be run at that location in the image frame.

12. The computer program product as set forth in claim 7, further comprising an operation of implementing a saliency mask to determine attention zones in the image frame for processing with the sliding window protocol and zones in the image frame that are to be ignored by the sliding window protocol.

13. A computer implemented method for detecting an object of interest in a scene, the method comprising an act of causing one or more processors to execute instructions encoded on a non-transitory computer-readable medium, such that upon execution of the instructions, the one or more processors perform operations of:
receiving an image frame of a scene;
extracting features from the image frame, the features being descriptors, wherein the features are extracted from the image frame by performing operations of:
creating three threads, one for each of three independent scales;
providing, for each thread, a link to the image frame and a set of running parameters;
running each thread, in parallel, to identify descriptors in each of the three threads;
upon completion of the three threads, compiling the results from each of the three threads into a full set of dense Scale Invariant Feature Transform (SIFT) descriptors (DSIFT);
quantizing the DSIFT descriptors to generate a pyramid histogram of visual word (PHOW) features;
implementing a sliding window protocol to slide a window over the image and analyze PHOW features that fall inside the window; and
determining if the PHOW features represent the object of interest and, if so, then designating the window as a location in the image with a detected object of interest.

14. The computer implemented method as set forth in claim 13, wherein determining if the PHOW features represent the object of interest further comprises operations of:
subdividing the window into a set of bins;
compiling, in each bin, a histogram of the PHOW features, the histograms representing a count of PHOW features found in each bin;
transforming the histograms by a Chi-Square homogeneous kernel transform;
feeding the transformed histograms into a support vector machine (SVM) classifier to generate an SVM score for each feature, the SVM scores representing a similarity of an object in the image to a target object;
squashing the SVM scores with a tangential sigmoid so that the SVM scores range from −1.0 to 1.0;
collecting the SMV scores into a list of scores;
reducing the list of scores using Non-Maximal Suppression to generate a reduced list of scores; and
applying a threshold to the reduced list of scores to eliminate any scores below a predetermined threshold and generate object scores, the object scores representing a likelihood that a particular object in the scene is the object of interest.

15. The computer implemented method as set forth in claim 14,
wherein quantizing the descriptors to generate PHOW features further comprises an operation of:
for each descriptor, performing a KD-tree query to identify a learned feature that the descriptor is most similar to, the identified features being the PHOW features;
wherein in implementing the sliding window protocol, the image frame is divided into a plurality of stripes, such that within each stripe are all the windows which might be run at that location in the image frame; and
further comprising an operation of implementing a saliency mask to determine attention zones in the image frame for processing with the sliding window protocol and zones in the image frame that are to be ignored by the sliding window protocol.

16. The computer implemented method as set forth in claim 13, wherein quantizing the descriptors to generate PHOW features further comprises an operation of:
for each descriptor, performing a KD-tree query to identify a learned feature that the descriptor is most similar to, the identified features being the PHOW features.

17. The computer implemented method as set forth in claim 13, wherein in implementing the sliding window protocol, the image frame is divided into a plurality of stripes, such that within each stripe are all the windows which might be run at that location in the image frame.

18. The computer implemented method as set forth in claim 13, further comprising an operation of implementing a saliency mask to determine attention zones in the image frame for processing with the sliding window protocol and zones in the image frame that are to be ignored by the sliding window protocol.

* * * * *